United States Patent
Matsuoka

(10) Patent No.: US 10,152,813 B2
(45) Date of Patent: Dec. 11, 2018

(54) COMPOSITE IMAGE CREATION SYSTEM, COMPOSITE IMAGE CREATION METHOD, AND NON-TRANSITORY COMPUTER READABLE MEDIUM STORING COMPOSITE IMAGE CREATION PROGRAM

(71) Applicant: JVC KENWOOD Corporation, Yokohama-shi, Kanagawa (JP)

(72) Inventor: Kenji Matsuoka, Yokohama (JP)

(73) Assignee: JVC KENWOOD CORPORATION, Kanagawa (JP)

( * ) Notice: Subject to any disclaimer, the term of this patent is extended or adjusted under 35 U.S.C. 154(b) by 122 days.

(21) Appl. No.: 15/276,529

(22) Filed: Sep. 26, 2016

(65) Prior Publication Data
US 2017/0076480 A1 Mar. 16, 2017

Related U.S. Application Data

(63) Continuation of application No. PCT/JP2015/000560, filed on Feb. 6, 2015.

(30) Foreign Application Priority Data

Mar. 28, 2014 (JP) ................. 2014-067642

(51) Int. Cl.
*G06K 9/00* (2006.01)
*G06T 5/00* (2006.01)
(Continued)

(52) U.S. Cl.
CPC .......... *G06T 11/60* (2013.01); *G06K 9/00724* (2013.01); *G06T 5/008* (2013.01); *G06T 5/50* (2013.01); *G06T 7/246* (2017.01); *G06T 11/00* (2013.01); *H04N 5/144* (2013.01); *H04N 5/20* (2013.01); *H04N 5/57* (2013.01);
(Continued)

(58) Field of Classification Search
CPC ....... G06K 9/00724; G06T 5/008; H04N 9/79
See application file for complete search history.

(56) References Cited

U.S. PATENT DOCUMENTS

| 2011/0255005 A1* | 10/2011 | Myoga | G06K 9/00724 348/700 |
| 2013/0121618 A1* | 5/2013 | Yadav | G06T 5/008 382/294 |
| 2013/0266292 A1* | 10/2013 | Sandrew | H04N 9/79 386/282 |

FOREIGN PATENT DOCUMENTS

JP 2002-298143 10/2002

* cited by examiner

*Primary Examiner* — Matthew Salvucci
(74) *Attorney, Agent, or Firm* — Procopio, Cory, Hargreaves & Savitch LLP

(57) ABSTRACT

A composite image creation system includes: a moving object region specifying unit that specifies a moving object region in each of a plurality of images consecutive in times series; a luminance correction unit that executes luminance correction processing to reduce a difference between a luminance signal in at least a part of one moving object region in one image and a luminance signal in at least a part of another moving object region in another image; and an image combining unit that combines the one image including the one moving object region subjected to the luminance correction processing and the other image including the other moving object region subjected to the luminance correction processing, and generates a composite image by adding predetermined color information to at least a part of the one moving object region and at least a part of the other moving object region in time series.

8 Claims, 14 Drawing Sheets

(51) Int. Cl.
*H04N 9/79* (2006.01)
*G06T 11/60* (2006.01)
*H04N 5/14* (2006.01)
*G06T 5/50* (2006.01)
*H04N 5/20* (2006.01)
*H04N 5/57* (2006.01)
*G06T 11/00* (2006.01)
*G06T 7/246* (2017.01)

(52) U.S. Cl.
CPC ..... *H04N 9/79* (2013.01); *G06T 2207/10004* (2013.01); *G06T 2207/10016* (2013.01); *G06T 2207/20221* (2013.01)

COMPOSITE IMAGE CREATION SYSTEM, COMPOSITE IMAGE CREATION METHOD, AND NON-TRANSITORY COMPUTER READABLE MEDIUM STORING COMPOSITE IMAGE CREATION PROGRAM

CROSS REFERENCE TO RELATED APPLICATION

This application is a continuation from PCT application No. PCT/JP2015/000560, filed Feb. 6, 2015, which claims the benefit of priority from Japanese patent application No. 2014-067642, filed Mar. 28, 2014, the disclosure of which is incorporated herein in its entirety by reference.

BACKGROUND

The present invention relates to a composite image creation system, a composite image creation method, and a non-transitory computer readable medium storing a composite image creation program. In particular, the present invention relates to a composite image creation system, a composite image creation method, and a non-transitory computer readable medium storing a composite image creation program which are capable of easily grasping temporal information from a composite image.

There has been conventionally known an athletic motion analysis supporting device (for example, see Japanese Unexamined Patent Application Publication No. 2002-298143) including: storage processing means for receiving images supplied from image pickup means and storing the images in a temporary storage unit; means for reading out a predetermined number of images stored in the temporary storage unit and generating a reference image from a plurality of read images to be processed; trajectory image generation means for comparing the generated reference image with each image to be processed and superimposing, on the reference image, different areas in which each image to be processed differs by a predetermined amount from the reference image, thereby generating a trajectory image; and trajectory image output means for outputting the generated trajectory image to an output device. According to the athletic motion analysis supporting device disclosed in Japanese Unexamined Patent Application Publication No. 2002-298143, information for quantitatively and intuitively analyzing the motion to be monitored of a facility or the like can be output by simple image processing, without depending on the situation outdoors or indoors.

SUMMARY

In the athletic motion analysis supporting device as disclosed in Japanese Unexamined Patent Application Publication No. 2002-298143, it is difficult to grasp a temporal relationship between a plurality of objects included in an image.

In order to solve the above-mentioned problem, an exemplary embodiment provides a composite image creation system including: a moving object region specifying unit that specifies a moving object region including a moving object in each of a plurality of images consecutive in times series; a luminance correction unit that executes luminance correction processing to reduce a difference between a luminance signal in at least a part of one moving object region in one image and a luminance signal in at least a part of another moving object region in another image; and an image combining unit that combines the one image including the one moving object region subjected to the luminance correction processing with the other image including the other moving object region subjected to the luminance correction processing, and generates a composite image by adding predetermined color information to at least a part of the one moving object region and at least a part of the other moving object region in time series.

In order to solve the above-mentioned problem, the exemplary embodiment provides a composite image creation method including: a moving object region specifying step of specifying a moving object region including a moving object in each of a plurality of images consecutive in times series; a luminance correction step of executing luminance correction processing to reduce a difference between a luminance signal in at least a part of one moving object region in one image and a luminance signal in at least a part of another moving object region in another image; and an image combining step of combining the one image including the one moving object region subjected to the luminance correction processing with the other image including the other moving object region subjected to the luminance correction processing, and generating a composite image by adding predetermined color information to at least a part of the one moving object region and at least a part of the other moving object region in time series.

Furthermore, in order to solve the above-mentioned problem, the exemplary embodiment provides a non-transitory computer readable medium storing a composite image creation program for a composite image creation system, the composite image creation program causing a computer to implement: a moving object region specifying function for specifying a moving object region including a moving object in each of a plurality of images consecutive in times series; a luminance correction function for executing luminance correction processing to reduce a difference between a luminance signal in at least a part of one moving object region in one image and a luminance signal in at least a part of another moving object region in another image; and an image combining function for combining the one image including the one moving object subjected to the luminance correction processing with the other image including the other moving object region subjected to the luminance correction processing, and generating a composite image by adding predetermined color information to at least a part of the one moving object region and at least a part of the other moving object region in time series.

DETAILED DESCRIPTION (Outline of Composite Image Creation System 1)

A composite image creation system 1 according to an exemplary embodiment is a system that generates a composite image including a trajectory of each of a plurality of objects having a motion (i.e., moving objects) included in a plurality of images constituting a moving image based on the plurality of images, and generates a composite image with which a temporal relationship between moving objects can be easily grasped. According to the composite image creation system 1, a plurality of moving objects each having a motion in one composite image can be distinguished and the temporal relationship between the moving objects can be grasped at a glance.

(Details of Composite Image Creation System 1)

Figure 1:
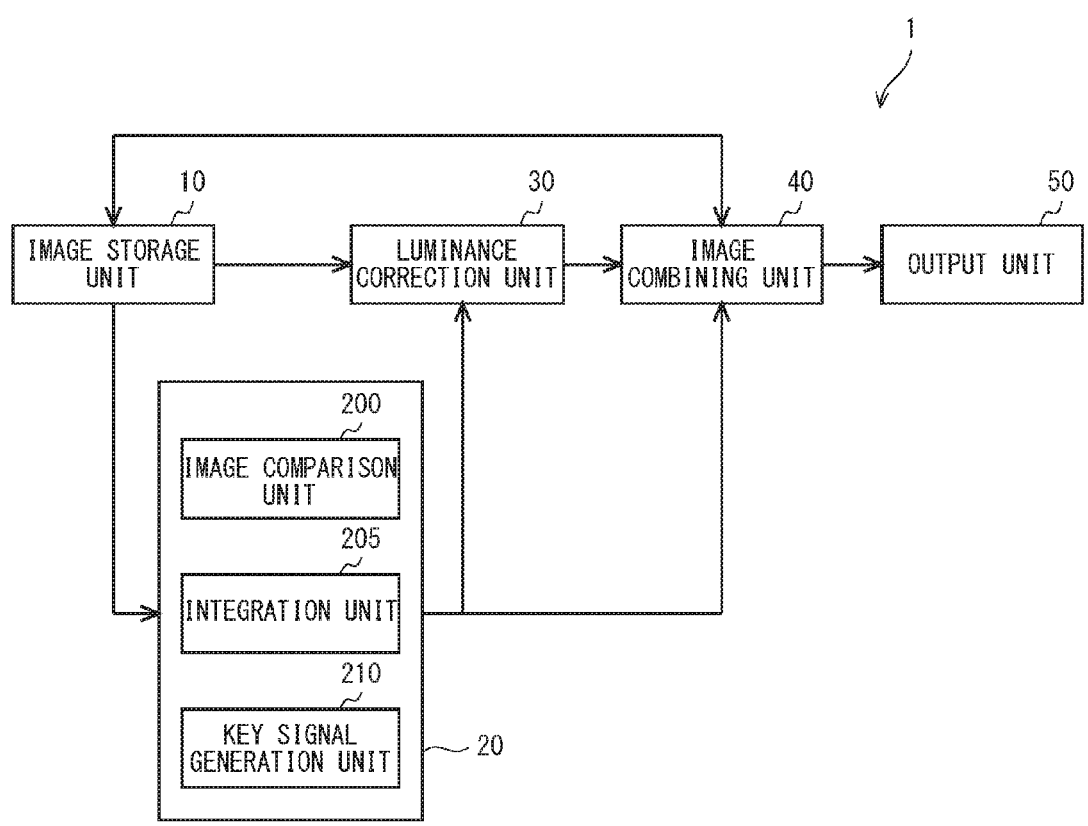
FIG. 1 is a block diagram showing a functional configuration of a composite image creation system according to an exemplary embodiment.

FIG. 1 shows an example of functional configuration blocks of the composite image creation system according to this embodiment.

The composite image creation system 1 includes an image storage unit 10 that stores a moving image; a moving object region specifying unit 20 that specifies a moving object region which is a region in which moving objects included in the image are present; a luminance correction unit 30 that performs luminance correction processing on at least a part of the moving object region within the image; an image combining unit 40 that generates a composite image; and an output unit 50 that outputs the composite image. The moving object region specifying unit 20 includes an image comparison unit 200 that compares a plurality of images using one of the plurality of images as a reference image; an integration unit 205 that integrates binary signals based on a comparison result of the image comparison unit 200; and a key signal generation unit 210 that generates a key signal based on an integration result of the integration unit 205.

(Image Storage Unit 10)

The image storage unit 10 stores a moving image. Specifically, the image storage unit 10 stores a moving image including moving objects. More specifically, the image storage unit 10 stores a plurality of image frames which constitute the moving image and are consecutive in times series. The image storage unit 10 supplies the moving image to the moving object region specifying unit 20 and the luminance correction unit 30 in response to actions performed by the moving object region specifying unit 20 and the luminance correction unit 30.

(Moving Object Region Specifying Unit 20)

The moving object region specifying unit 20 specifies a moving object region including a moving object in each of a plurality of images which are stored in the image storage unit 10 and are consecutive in times series. Specifically, the moving object region specifying unit 20 includes the image comparison unit 200 that compares one image with another image which are stored in the image storage unit 10 and calculates a difference between the one image and the other image; the integration unit 205 that integrates calculation results of the image comparison unit 200; and the key signal generation unit 210 that generates a key signal for specifying a moving object region included in the one image based on the integration result of the integration unit 205.

More specifically, the image comparison unit 200 acquires one image (hereinafter referred to as a "first image") and another image (hereinafter referred to as a "second image") from the images stored in the image storage unit 10. The image comparison unit 200 calculates a difference between the luminance value or hue value of the first image and the luminance value or hue value of the second image for each pixel or each pixel block. When the absolute value of the calculated difference is greater than a predetermined first threshold, the image comparison unit 200 generates a binary signal indicating "1", and when the absolute value is equal to or smaller than the first threshold, the image comparison unit 200 generates a binary signal indicating "0". The image comparison unit 200 supplies the generated binary signal to the integration unit 205.

Further, the image comparison unit 200 acquires an image (hereinafter referred to as a "third image"), which is different from the first and second images, from the image storage unit 10. The image comparison unit 200 calculates a difference between the first image and the third image and generates a binary signal in the same manner as that described above. The image comparison unit 200 supplies the generated binary signal to the integration unit 205.

The integration unit 205 adds up the binary signals received from the image comparison unit 200. Specifically, the integration unit 205 adds up the binary signal calculated based on the first and second images and the binary signal calculated based on the first and third images.

The image comparison unit 200 compares the first image with still another image (hereinafter referred to as a "fourth image") and calculates the difference therebetween in the same manner as that described above, and generates a binary signal in the same manner as that described above. Further, the integration unit 205 adds up the binary signals obtained by integrating and the binary signals calculated based on the first image and the fourth image.

In this manner, when the image comparison unit 200 acquires N (N is an integer equal to or greater than 2) images to be compared from the image storage unit 10, the image comparison unit 200 calculates a plurality of binary signals based on the difference between the first image and each of the images ranging from the second image to the N-th image. Further, the integration unit 205 integrates the plurality of binary signals calculated by the image comparison unit 200, and generates an integrated signal of the binary signals with a signal level in a range from 0 to N−1. The integration unit 205 supplies the generated integrated signal to the key signal generation unit 210.

The key signal generation unit 210 controls the amplitude of the signal level of the integrated signal to fall within a range of predetermined constant values by using a predetermined second threshold for the integrated signal supplied from the integration unit 205. Accordingly, the key signal generation unit 210 generates a first key signal which is used to extract a moving object region including moving objects of the first image.

Next, the image comparison unit 200 and the integration unit 205 execute the same processing as that described above on the second image and N−1 images excluding the second image from the images ranging from the first image to the N-th image. Further, the key signal generation unit 210 generates a second key signal in the same manner as that described above. The moving object region specifying unit 20 executes the same processing as that described above on each of the images ranging from the third image to the N-th image, thereby generating third to N-th key signals. The key signal generation unit 210 supplies the generated key signals to the luminance correction unit 30.

Note that the image comparison unit 200 treats the N−1 images excluding an image to be compared from the images ranging from the first image to the N-th image. However, in the comparison between the same images (for example, in the comparison between the first image and the first image), the difference between the images is "0". In this case, the binary signal is fixed to "0". Accordingly, in order to simplify a control circuit, the image comparison unit 200 can perform comparison processing on each of the N images from the first image to the N-th image.

(Luminance Correction Unit 30)

The luminance correction unit 30 executes luminance correction processing to reduce a difference between a luminance signal in at least a part of one moving object region in one image and a luminance signal in at least a part of another moving object region in another image. Specifically, the luminance correction unit 30 acquires the first image from the image storage unit 10. Further, the luminance correction unit 30 performs luminance correction processing on the region specified by the first key signal based on coordinate information of the first key signal generated by the key signal generation unit 210. Note that the luminance correction unit 30 can perform luminance correction processing only on a region in the vicinity of the contour of the region specified by the first key signal. The luminance correction unit 30 supplies the first image subjected to luminance correction processing to the image combining unit 40.

Next, the luminance correction unit 30 acquires the second image from the image storage unit 10. Further, the luminance correction unit 30 performs luminance correction processing on the region specified by the second key signal based on coordinate information of the second key signal generated by the key signal generation unit 210. The luminance correction unit 30 supplies the second image subjected to luminance correction processing to the image combining unit 40.

(Image Combining Unit 40)

The image combining unit 40 overwrites only the moving object region from a plurality of images, thereby generating a composite image including a trajectory of each moving object. Specifically, the image combining unit 40 combines one image including one moving object region subjected to luminance correction processing with another image including another moving object region subjected to luminance correction processing, and generates a composite image by adding predetermined color information to at least a part of one moving object region and at least a part of another moving object region in time series.

For example, the image combining unit 40 combines the first image and the second image which are subjected to luminance correction processing by using the amplitude information of the second key signal obtained as described above. When the key signal is a signal having an amplitude from 0 to m, the image combining unit 40 generates a composite image based on a formula of (first image subjected to luminance correction)×(m−second key signal)/m+ (second image subjected to luminance correction)×(second key signal)/m.

The image combining unit 40 uses, as it is, the first image subjected to the luminance correction processing for the portion in which the second key signal indicates "0", and uses, as it is, the second image subjected to the luminance correction processing for the portion in which the second key signal indicates "m". Further, the image combining unit 40 generates an image in which the first image and the second image that are subjected to the luminance correction processing are mixed at a ratio corresponding to the value of the second key signal in the portion in which the second key signal indicates a value between 0 and m. The image combining unit 40 supplies, to the image storage unit 10, the composite signal of the image in which the first image and the second image are mixed. The image storage unit 10 stores the composite signal as a composite image (1+2).

Next, the luminance correction unit 30 acquires the third image from the image storage unit 10, executes the luminance correction processing in the same manner as that described above, and supplies the third image subjected to the luminance correction processing to the image combining unit 40. The image combining unit 40 generates a composite signal using the third image subjected to the luminance correction processing, the composite image (1+2) stored in the image storage unit 10, and the third key component signal in the same manner as that described above when the composite image (1+2) is generated. The image combining unit 40 supplies the generated composite signal to the image storage unit 10. The image storage unit 10 stores the composite signal as a composite image (1+2+3).

The luminance correction unit 30 and the image combining unit 40 perform the above-described processing on each of the images ranging from the first image to the N-th image. Thus, a composite image (1+2+ . . . N) is stored in the image storage unit 10. The composite image (1+2+ . . . N) is the composite image finally obtained. Note that the luminance correction unit 30 can generate a composite image by using, as it is, a color signal of each image as a color signal specified by each key signal, without executing the luminance correction processing.

The image combining unit 40 can generate a composite image using predetermined color information in time series as color information about the moving object region specified by each key signal. In this case, the image combining unit 40 performs the luminance correction processing on the moving object region, and adds the color information to the entire moving object region. The image combining unit 40 can also add the color information to the contour of one moving object region and the contour of another moving object region. In this case, the image combining unit 40 performs the luminance correction processing on the contour region of each moving object and adds color information only to the contour region.

When the color information is added to each moving object, the image combining unit 40 can determine the color information to be added based on the background color of one moving object region and the background color of another moving object region. For example, when images include an image of a game in a place, such as on a lawn, the background color of the image is a color of a green color system, and when images include an image of a game in a place, such as on the ground, the background color of the image is a color of a yellow or brown color system. In this case, if the color information to be added to each moving object of the composite image indicates a color of the same color system as the background colors, it is difficult to visually recognize the moving object. Accordingly, the image combining unit 40 can prevent a color of the same color system as the background color of the image from being added to each moving object during generation of the composite image.

Further, when the color information is added, the image combining unit 40 can use a monochrome image as the background color of one moving object region and as the background color of another moving object region. For example, when various colors are present in the background of an image and the colors affect the visibility of a color representing temporal information of a composite image, the image combining unit 40 can use a monochrome image as the background image.

The image combining unit 40 can also add the color information to at least a part of one moving object region and at least a part of another moving object region based on a predetermined wavelength order. Specifically, the image combining unit 40 can generate the trajectory of rainbow colors by adding, for the trajectory of each moving object, the color information to at least a part of the moving object region in descending order of wavelength or ascending order of wavelength in time series. The image combining unit 40 supplies the generated composite image to the output unit 50.

(Output Unit 50)

The output unit 50 visibly outputs the composite image to a user. The output unit 50 is, for example, a display device such as a monitor. The output unit 50 may be an output device such as a printer for printing the composite image. Further, the output unit 50 can output data of the composite image to the outside of the composite image creation system 1.

(Outline of Luminance Correction Processing)

Figure 2:
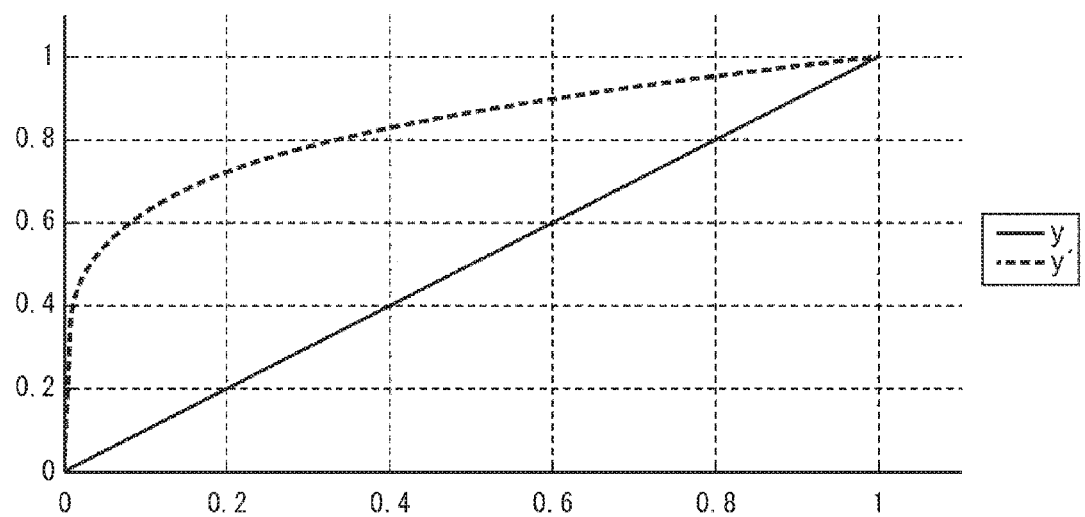
FIG. 2 is a schematic diagram showing processing in a luminance correction unit according to the exemplary embodiment.

FIG. 2 shows an outline of processing in the luminance correction unit according to this embodiment.

The luminance correction unit 30 executes the luminance correction processing to set luminance signals of a plurality of moving objects closer to each other, without specifying the exact moving object region of each moving object present in one image. For example, the luminance correction unit 30 executes the luminance correction processing based on a nonlinear circuit.

This processing will be described in detail with reference to FIG. 2. FIG. 2 is a graph showing y=x where y represents a linear output with respect to an input signal (horizontal axis), and also showing $y'=x^{0.2}$ where y' represents a nonlinear output with respect to the input signal. For example, assume that average luminances of two moving objects whose luminance signals need to be set closer to each other are "0.2" and "0.6", respectively. In this case, the ratios between the luminance levels of the two moving objects differ by a factor of 3. When the signals are supplied to a circuit having a function of $y'=x^{0.2}$, the signal representing the average luminance of "0.2" indicates "0.72" and the signal representing the average luminance of "0.6" indicates "0.90". Thus, the ratio between the signals is 1:1.25. Although it is difficult to completely match the luminance levels of the two moving objects, the approximation of the ratios between the luminance signals makes it possible to more easily compare the images colored with different colors, than when the luminance signals before conversion are used. Since a signal in a region with a low luminance level is converted into a signal with a high luminance level as shown in FIG. 2, the generation of an entirely dark composite image in which the luminance signal is low and it is difficult to distinguish the colors can be prevented. Note that the luminance correction unit 30 may calculate average luminances of moving object regions specified by a plurality of key signals present in one image, and may execute the luminance correction processing based on the calculated luminances.

(Outline of Contour Extraction)

Figure 3:
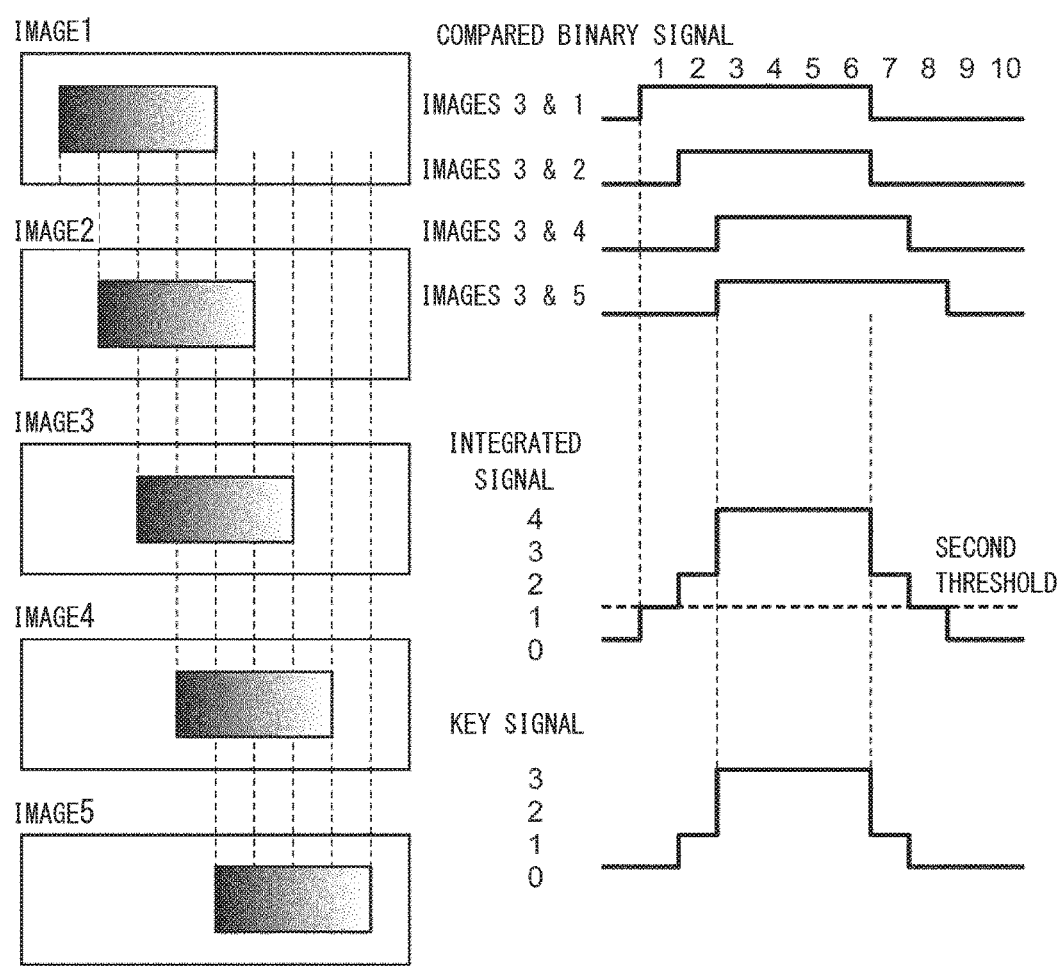
FIG. 3 is a process diagram showing the composite image creation system according to the exemplary embodiment.

FIG. 3 shows an example of processing in the composite image creation system according to this embodiment.

The luminance correction unit 30 can extract the contour of each moving object by using, for example, a high-pass filter (HPF) for extracting a high-frequency component of the key signal of each moving object. The luminance correction unit 30 can also extract the contour of each moving object in the manner as described below.

First, the key signal generation unit 210 generates each key signal based on the integrated value of binary signals representing differences obtained by comparing a plurality of images. A case will be described in which, as shown in the images on the left side of FIG. 3, the number of images is five and the key signal of "IMAGE 3", which is a middle point of the movement of the five images when the moving object is gradually moving rightward, is generated.

When the "IMAGE 3" and "IMAGE 1" shown in FIG. 3 are compared, the luminance correction unit 30 determines that a difference equal to or greater than a set value of a first threshold is generated and executes processing on the region excluding the background image which is common to "IMAGE 1" and "IMAGE 3". Similarly, the luminance correction unit 30 executes processing on "IMAGE 3" and "IMAGE 2", "IMAGE 3" and "IMAGE 4", and, "IMAGE 3" and "IMAGE 5". In this case, binary signals as shown in the upper right of FIG. 3 are obtained.

When the integration unit 205 integrates the four binary signals shown in FIG. 3, signals having signal levels of 0 to 4 as shown in the center on the right side of FIG. 3 are obtained.

When values equal to or less than the level 1 of the signals are cut by the second threshold in the key signal generation unit 210, the key signal as shown in the lower right of FIG. 3 is created. In this case, when the portion corresponding to the level 3 of the key signal is controlled as a moving object portion of "IMAGE 3" and the portion corresponding to the level 1 of the key signal is controlled as a contour signal of "IMAGE 3", the luminance correction unit 30 can extract the contour of "IMAGE 3" without the need for adding a contour detection processing function for each key signal.

Note that in the example shown in FIG. 3, since "IMAGE 3" at the center time of movement of the images to be used is used, the contour signal that is uniform on the right and left sides is obtained, while in "IMAGE 1" and "IMAGE 5", the contour signal that is biased to one side is obtained. However, the luminance correction unit 30 can employ the above-described method to reduce the processing load in the system by employing simple contour extraction processing.
(Processing in Reference Example)

Figure 4:
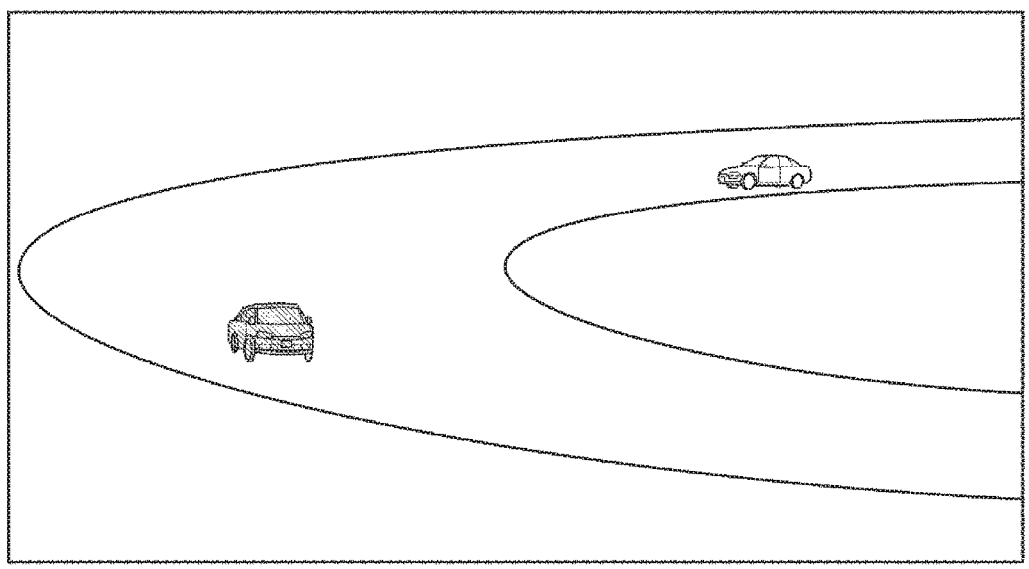
FIG. 4 is a diagram showing an image including a plurality of moving objects when a system of a reference example is used instead of using the system of this exemplary embodiment.
Figure 5:
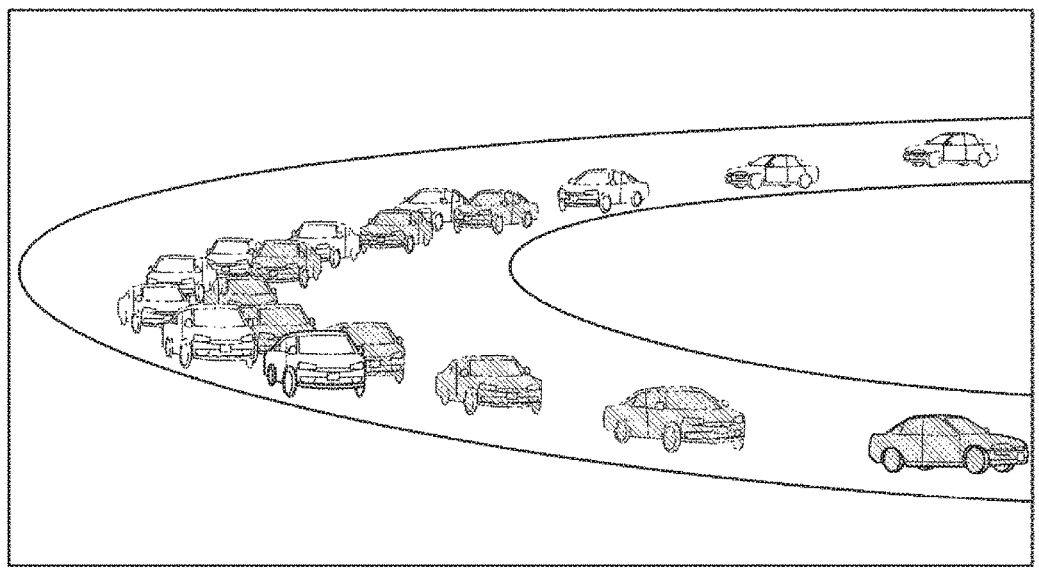
FIG. 5 is a diagram showing an image including a plurality of moving objects when the system of the reference example is used instead of using the system of this exemplary embodiment.

FIGS. 4 and 5 show examples of an image including a plurality of moving objects when a system of a reference example is used instead of using the system of this embodiment. FIGS. 6A to 6H are examples of an outline schematically showing an image including a plurality of moving objects when the system of the reference example is used. FIGS. 7A to 7C show examples of an outline schematically showing a composite image when the luminance correction is not performed.

First, as shown in FIGS. 4 and 5, a case where a plurality of moving objects are present in an image (FIGS. 4 and 5 show a scene in which, for example, two racing cars turn a corner) will be described. In this example, as shown in FIG. 4, a vehicle with a low luminance level precedes a vehicle with a high luminance level. FIG. 5 shows an image obtained by combining trajectories by using images preceding and following the image shown in FIG. 4. Referring to FIG. 5, it can be understood that two vehicles take different routes, but it is difficult to understand which one of the vehicles precedes the other, or it is difficult to grasp the location of the vehicle traveling behind in the image when the preceding vehicle is located at a predetermined position. This state is schematically shown in FIGS. 6A to 6H.

Figure 6A:
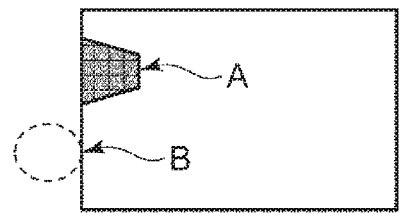
FIG. 6A is a schematic diagram showing an image including a plurality of moving objects when the system of the reference example is used.
Figure 6B:
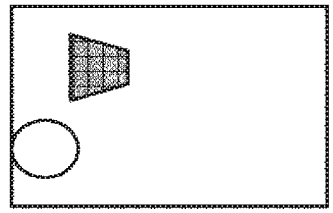
FIG. 6B is a schematic diagram showing an image including a plurality of moving objects when the system of the reference example is used.
Figure 6C:
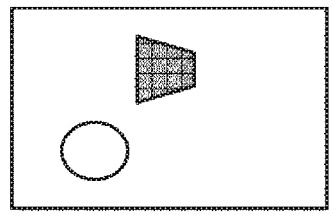
FIG. 6C is a schematic diagram showing an image including a plurality of moving objects when the system of the reference example is used.
Figure 6D:
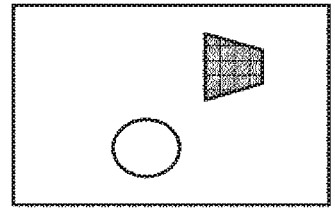
FIG. 6D is a schematic diagram showing an image including a plurality of moving objects when the system of the reference example is used.
Figure 6E:
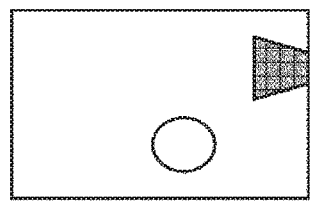
FIG. 6E is a schematic diagram showing an image including a plurality of moving objects when the system of the reference example is used.
Figure 6F:
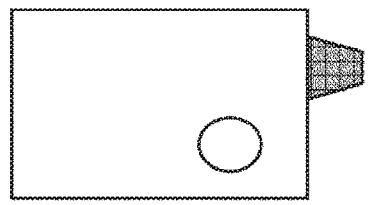
FIG. 6F is a schematic diagram showing an image including a plurality of moving objects when the system of the reference example is used.
Figure 6G:
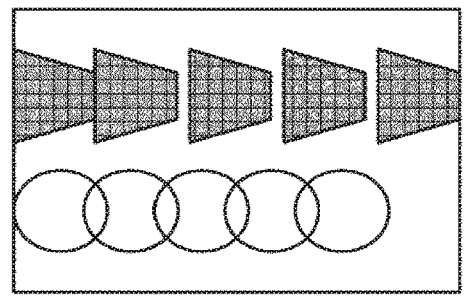
FIG. 6G is a schematic diagram showing an image including a plurality of moving objects when the system of the reference example is used.
Figure 6H:
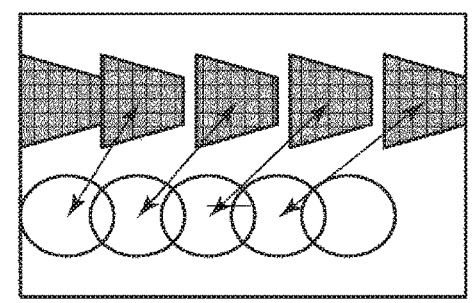
FIG. 6H is a schematic diagram showing an image including a plurality of moving objects when the system of the reference example is used.
Figure 7A:
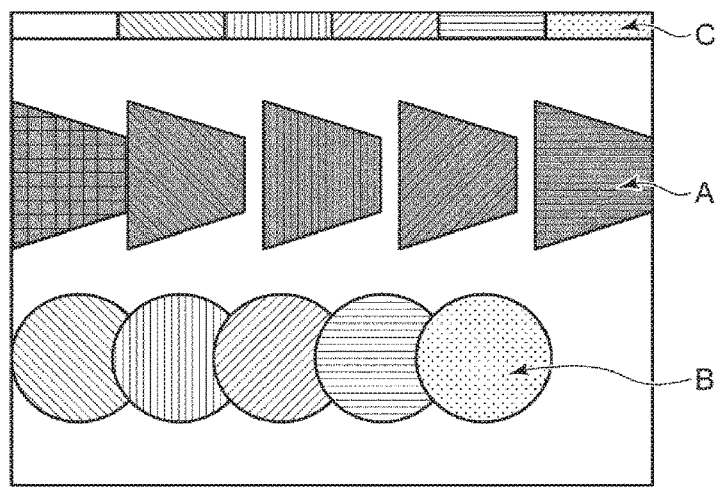
FIG. 7A is a schematic diagram schematically showing a composite image when a luminance correction is not performed.
Figure 7B:
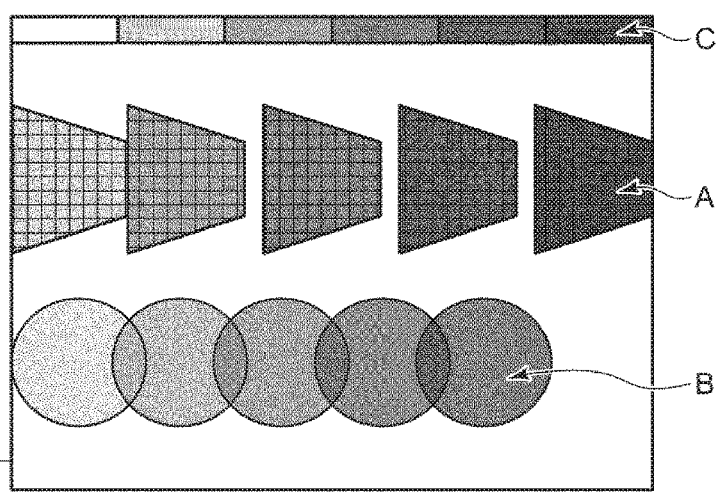
FIG. 7B is a schematic diagram schematically showing a composite image when the luminance correction is not performed.
Figure 7C:
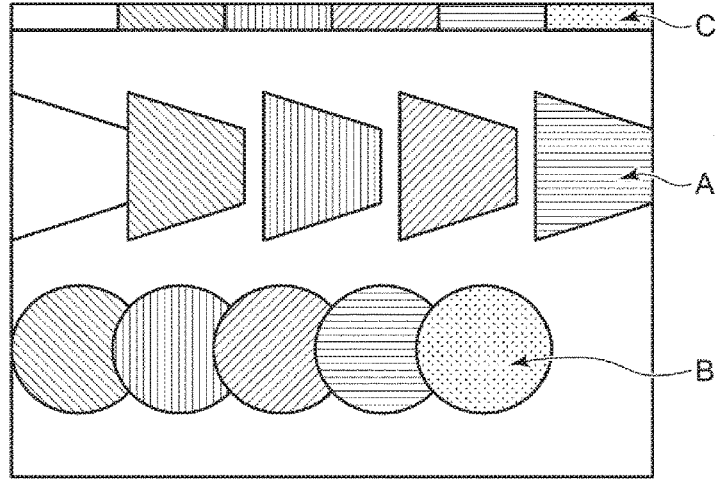
FIG. 7C is a schematic diagram schematically showing a composite image when the luminance correction is not performed.

FIGS. 6A to 6F show frame images which vary with time. At the time shown in FIG. 6A, an object A which has a trapezoidal shape, has a low luminance signal level, and is represented by a checkered pattern appears on the left side of the screen. At this time, a circular, white object B which has a high luminance level and is represented by a dashed line has not appeared on the screen yet. At the time shown in FIG. 6B, the object B enters into the screen from the left side of the screen, and the object A moves rightward. The objects A and B move rightward with time to the states as shown in FIGS. 6C to 6E, and at the time shown in FIG. 6F, the object A moves outside of the screen from the right side of the screen as represented by a dashed line. When the trajectories of these images are combined, an image shown in FIG. 6G can be obtained. Five images of the object A, as well as five images of the object B are seen in the screen, and the traveling speed of the object A is higher than the traveling speed of the object B. In this case, for example, when racing cars turn a corner as mentioned above, not only the difference in speed between the cars, but also trajectories, such as route taking required for cornering, can be confirmed. However, in practice, the temporal contexts of the objects A and B have a relation as represented by arrows in FIG. 6H. Accordingly, when the system according to this embodiment is not used, it is difficult to grasp the temporal positional relationship between the object A and the object B as shown in FIG. 6G.

A case where colors are added to the respective moving objects as shown in FIGS. 7A to 7C will now be considered. In the examples shown in FIGS. 7A to 7C, the colors are represented by patterns such as oblique lines. FIGS. 7A and 7C each show a state in which the color signal varies with time in such a manner that "plain→oblique lines slanting to the right→vertical lines→oblique lines slanting to the left→horizontal lines→dotted pattern". In this case, a composite image obtained by combining the trajectories of the moving objects as shown in FIG. 7A is obtained. In FIG. 7A, C indicates an index display showing time. In this case, the relation between the index display C and the object B which is plain and has a high signal level is extremely easy to grasp. However, it is difficult to grasp the relation between the index display C and the object A which has some patterns and a low luminance level. As a result, it is difficult to grasp the temporal relationship between the object A and the object B. If the number of types of color codes is small, distinguishable colors, such as "red→yellow→green-→blue→violet", can be selected even when the luminance levels and patterns of the moving objects are slightly different. However, as the number of types of color codes increases, more colors such as intermediate colors are used. In this case, the influence of the luminance levels and patterns of the moving objects increases. As a result, it becomes difficult to distinguish the temporal relationship between the objects.

FIG. 7B shows a case where the density of the color to be added to each moving object is changed. Also in this case, it is difficult to grasp the temporal relationship between the objects A and B and the index display C depending on the original luminance level, color, and/or patterns of the object A. FIG. 7C shows a case where the patterns to be added to each moving object is changed. In this case, since attention is focused only on the patterns, the temporal relationship between the objects A and B and the index display C is clear. However, the original patterns or the like of each moving object are erased. In the case of FIG. 7C, the two moving objects have distinctly different shapes, such as a trapezoid and a circle, which makes it possible to distinguish the two moving objects. However, many of the images to be used for creating a composite image by combining trajectories of a plurality of moving objects are, for example, images of racing cars and athletes playing a game. Thus, the shapes of moving objects to be distinguished in one image are extremely similar to each other. Therefore, the discrimination of moving objects depends on, for example, the patterns of vehicles, the color or patterns of uniforms, or the facial expressions of people. Accordingly, if the original features of each moving object are drastically changed, it becomes difficult to distinguish the plurality of moving objects.
(Details of Processing in the Composite Image Creation System 1)

Figure 8:
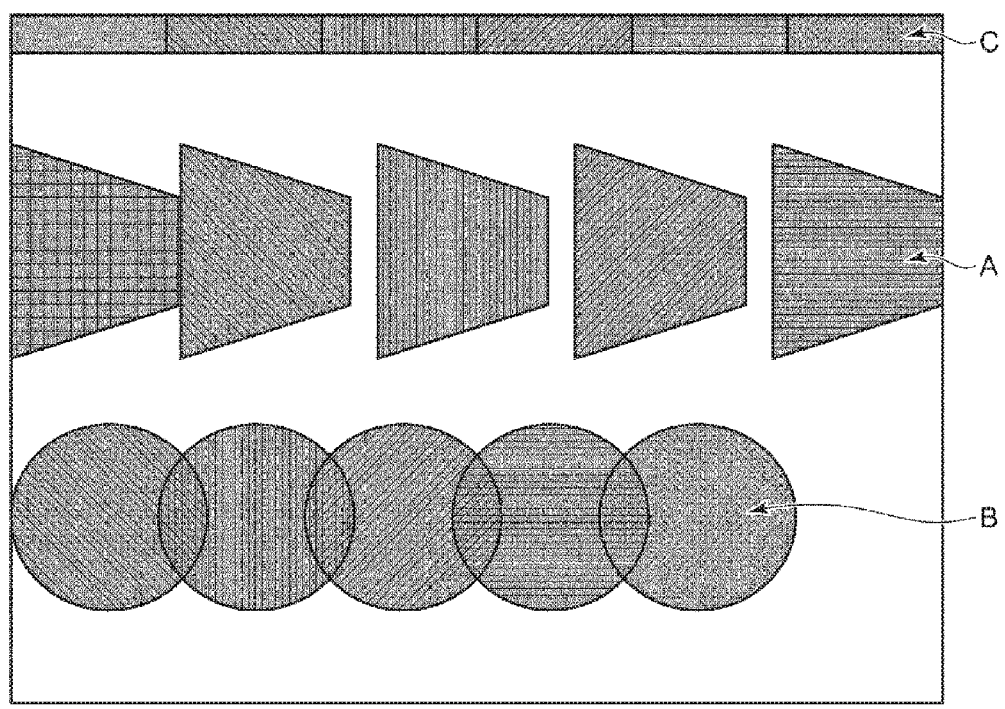
FIG. 8 is a detailed diagram showing processing in the composite image creation system according to the exemplary embodiment.
Figure 9:
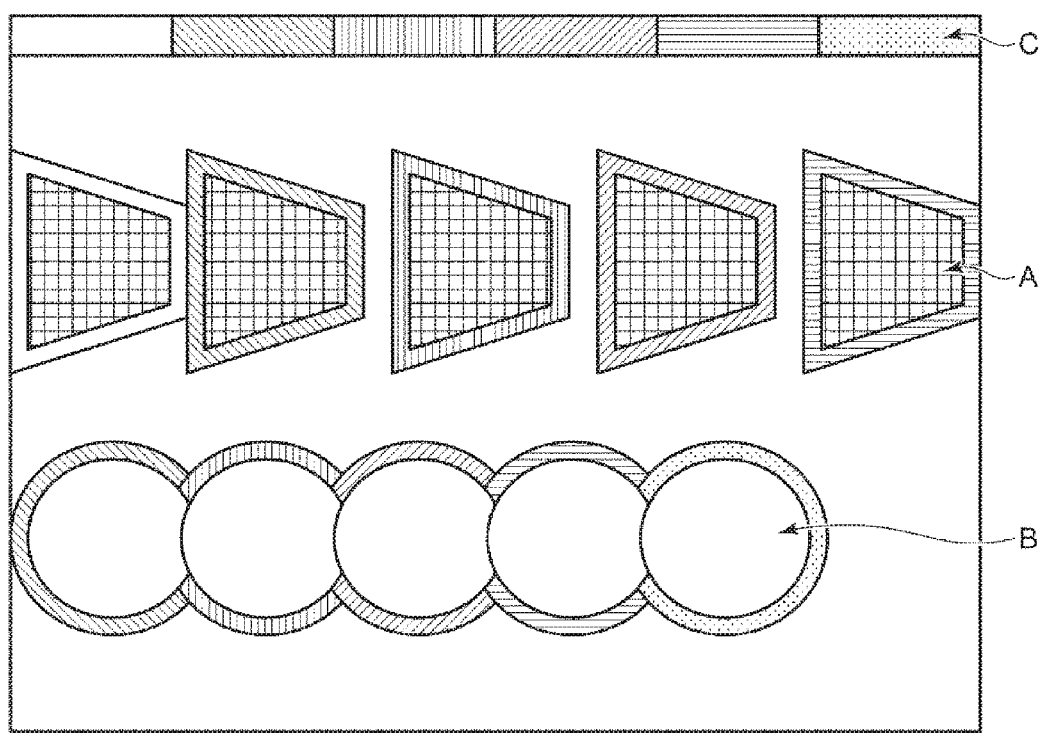
FIG. 9 is a detailed diagram showing processing in the composite image creation system according to the exemplary embodiment.

FIGS. 8 and 9 schematically show the details of processing in the composite image creation system according to this embodiment.

As described above with reference to the functional configuration block diagram, the composite image creation system 1 according to this embodiment executes signal processing capable of grasping temporal axis information, while enabling to discriminate a plurality of moving objects. First, the composite image creation system 1 adds temporal axis information based on an order of colors to the composite image after setting the luminance signal levels of the plurality of moving objects closer to each other. FIG. 8 is a diagram showing a state in which processing for setting the luminance levels of the objects A and B closer to each other within a range in which the patterns of the object A are recognizable as a moving object is performed on FIG. 7A.

In this figure, the colors are represented by patterns such as oblique lines in the same manner as shown in FIGS. 7A and 7C. The object A and the object B have similar luminance levels and the same color, but have different patterns. This makes it possible to distinguish the two objects and easily grasp the temporal relationship between the objects. In this case, if the luminance level is lowered, each color becomes darker, and if the luminance level is extremely high, white-out occurs in each color. Accordingly, the luminance correction unit 30 preferably generates the luminance signal at an intermediate level.

Further, the composite image creation system 1 can add temporal axis information based on fixed luminance levels and an order of colors only to the contour of each object. An example of this case is shown in FIG. 9. The discrimination of each moving object is executed using a portion other than the contour of each moving object, and the temporal relationship is grasped using the color of the contour portion.

Although not shown, the composite image creation system 1 can execute the following methods in combination with the above-described method. That is, the composite image creation system 1 can execute, for example, a method for coloring the entire surface of a plurality of moving objects and setting the luminance level of only the contour portion of each moving object to a fixed value; a method for coloring the entire surface of signals in which the luminance levels of a plurality of moving objects are set closer to each other and setting the luminance level of the contour of each moving object to a fixed value; or a method for setting the luminance levels of moving objects closer to each other in a portion of each moving object other than the contour thereof. Furthermore, the composite image creation system 1 can add a marker having a predetermined shape to a part of each moving object included in an image.

(Method for Adding Color Information)

Figure 10:
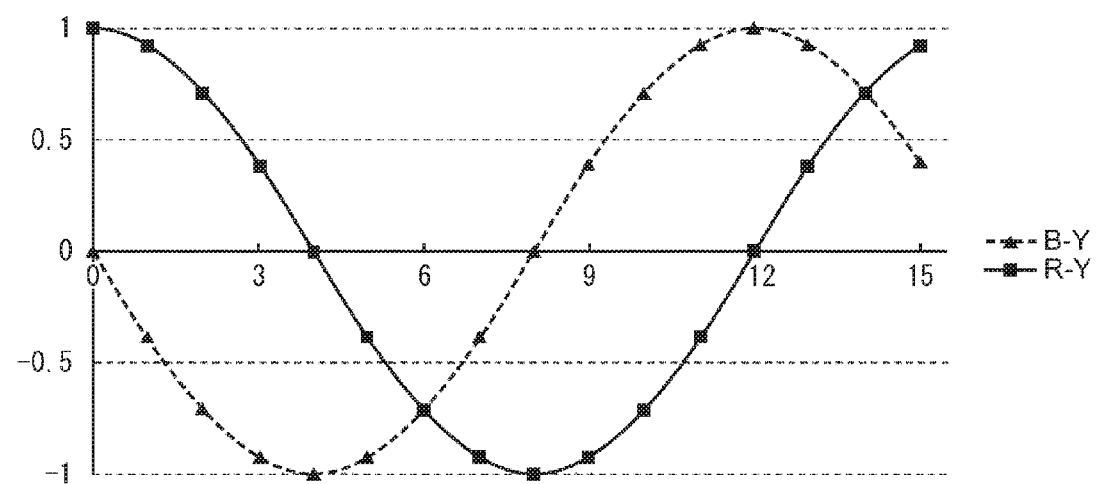
FIG. 10 is a graph showing how to change colors to be added to each moving object when 16 images are combined in the composite image creation system according to the exemplary embodiment.
Figure 11:
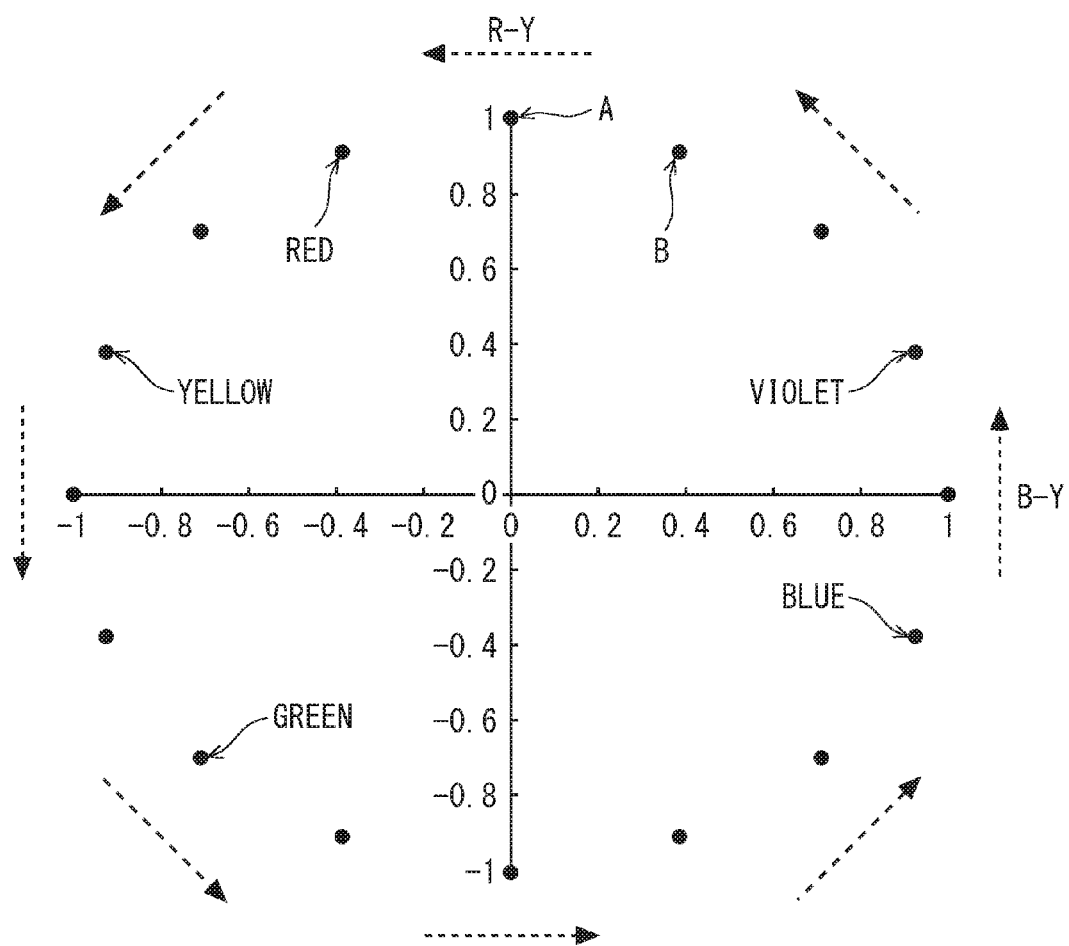
FIG. 11 is a diagram showing how to change colors to be added to each moving object when 16 images are combined in the composite image creation system according to the exemplary embodiment.

FIGS. 10 and 11 show examples of how to change the color to be added to each moving object when 16 images are combined in the composite image creation system according to this embodiment.

When the image combining unit 40 adds color information to each moving object, a circuit or program generates a fixed color by providing a predetermined function to two color difference signals R-Y and B-Y or by using data on color information read out of a prepared database. As shown in FIG. 10, for example, when the image combining unit 40 combines 16 images (indicated by 0 to 15 in FIG. 10), in the color information to be added to moving objects included in each image, R-Y components are changed by Cos function according to the order of composition, and B-Y components are changed by -Sin function according to the order of composition. In this case, the color signal starts from a point A shown in FIG. 11, and the color of the color signal is changed counterclockwise and the color change ends at a point B. However, if the point A which represents a first color is close to the point B which represents a last color, it may be difficult to distinguish the start point from the end point. For this reason, the image combining unit 40 use colors with different brightness or chroma levels for color information to be added to a first moving object region at a start time in time series and for color information to be added to a second moving object region at an end time in the time series. Specifically, the image combining unit 40 determines the order of colors for 16 divided regions starting from red as shown in FIG. 11, and the color is changed counterclockwise and the color change ends at a point of violet. Then, the image combining unit 40 adds the determined color information to each moving object.

(Composite Image Creation Method)

Figure 12:
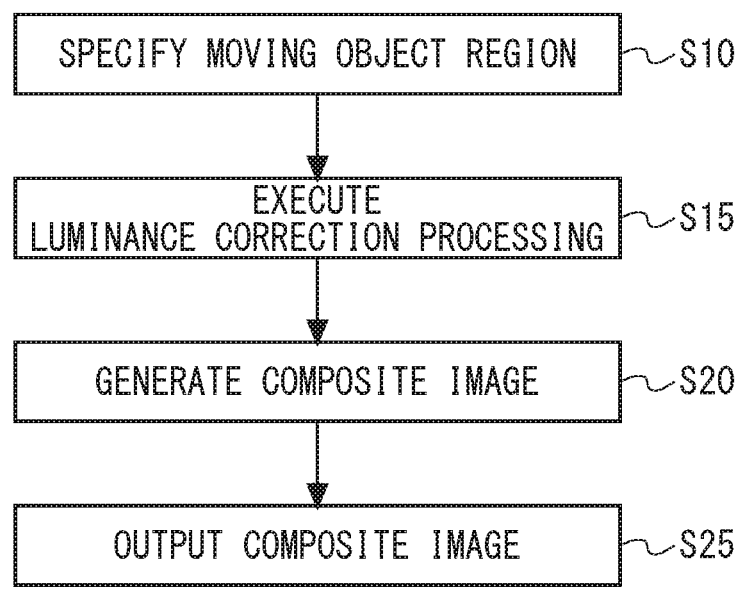
FIG. 12 is a flowchart showing processing of the composite image creation system according to the exemplary embodiment.

FIG. 12 shows an example of a processing flow of the composite image creation system according to the exemplary embodiment.

First, the moving object region specifying unit 20 specifies the moving object region which is included in each of a plurality of images stored in the image storage unit 10 and indicates the location of each moving object in the plurality of images (step 10; the step is represented as "S"). Next, the luminance correction unit 30 executes the luminance correction processing to reduce the difference between the luminance signal in at least a part of the moving object region of one reference image and the luminance signal in at least a part of the moving object region of another image (S15). Subsequently, the image combining unit 40 combines the plurality of images including the moving object region subjected to the luminance correction processing, and generates a composite image by adding predetermined color information to at least a part of one moving object region and at least a part of another moving object region in time series (S20). Then, the output unit 50 outputs the composite image (S25).

Figure 13:
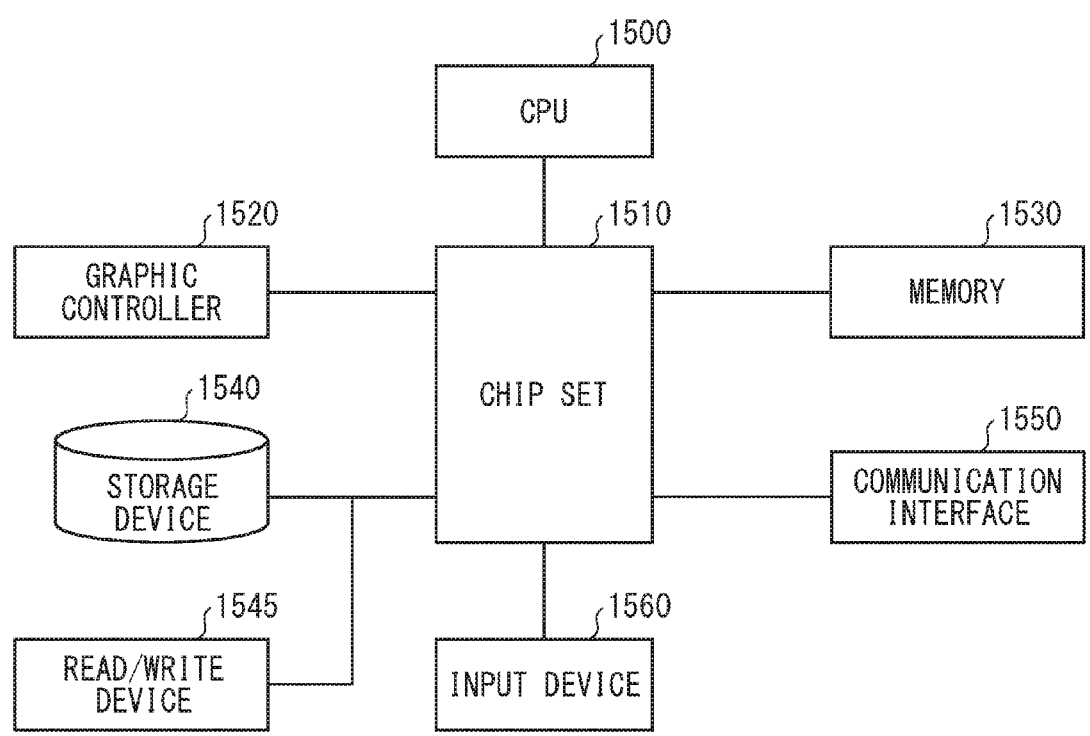
FIG. 13 is a hardware block diagram showing the composite image creation system according to the exemplary embodiment.

FIG. 13 shows an example of a hardware configuration of the composite image creation system according to the exemplary embodiment.

The composite image creation system 1 according to this exemplary embodiment includes: a CPU 1500; a graphic controller 1520; a memory 1530 such as a Random Access Memory (RAM), a Read-Only Memory (ROM), and/or a flash ROM; a storage device 1540 that stores data; a read/write device 1545 that reads data from a recording medium and/or writes data into a recording medium; an input device 1560 that inputs data; a communication interface 1550 that transmits data to an external communication device and receives data therefrom; and a chip set 1510 that connects the CPU 1500, the graphic controller 1520, the memory 1530, the storage device 1540, the read/write device 1545, the input device 1560, and the communication interface 1550 to each other in such a manner that they can communicate with each other.

The chip set 1510 connects the memory 1530, the CPU 1500, which accesses the memory 1530 and executes predetermined processing, and the graphic controller 1520, which controls the display of an external display device, to each other, thereby executing data delivery between the components. The CPU 1500 operates based on a program stored in the memory 1530 and controls each component. The graphic controller 1520 causes a predetermined display device to display images based on image data temporarily stored in a buffer which is provided in the memory 1530.

Further, the chip set 1510 connects the storage device 1540, the read/write device 1545, and the communication interface 1550 to each other. The storage device 1540 stores a program and data to be used by the CPU 1500 of the composite image creation system 1. The storage device 1540 is, for example, a flash memory. The read/write device 1545 reads a program and/or data from the storage medium storing the program and/or data, and stores the read program and/or data in the storage device 1540. The read/write device 1545 acquires a predetermined program from a server on the Internet via, for example, the communication interface 1550, and stores the acquired program in the storage device 1540.

The communication interface 1550 executes transmission and reception of data with an external device via a communication network. When the communication network is disconnected, the communication interface 1550 can execute transmission and reception of data with the external device without involving the communication network. The input device 1560, such as a keyboard, a tablet, or a mouse, is connected to the chip set 1510 via a predetermined interface.

A composite image creation program for the composite image creation system 1 that is stored in the storage device 1540 is provided to the storage device 1540 via a communication network, such as the Internet, or via a recording medium, such as a magnetic recording medium or an optical recording medium. The composite image creation program for the composite image creation system 1 that is stored in the storage device 1540 is executed by the CPU 1500.

The composite image creation program executed by the composite image creation system 1 according to this embodiment works on the CPU 1500 to cause the composite image creation system 1 to function as the image storage unit 10, the moving object region specifying unit 20, the luminance correction unit 30, the image combining unit 40, the output unit 50, the image comparison unit 200, the integration unit 205, and the key signal generation unit 210 which are described above with reference to FIGS. 1 to 12.

(Effects Of Embodiments)

The composite image creation system 1 according to this embodiment executes the processing as described above in the embodiments, thereby enabling discrimination of moving objects as a plurality of moving objects in one trajectory composite image and generation of the composite image with which the relationship between the temporal axes of the plurality of moving objects can be easily recognized. In other words, the composite image creation system 1 can generate the composite image with which a plurality of moving objects each having a motion can be distinguished and the temporal relationship between the moving objects can be grasped at a glance.

While the exemplary embodiments have been described above, the invention according to the claims is not limited by the exemplary embodiments described above. It should be noted that not all the combinations of the features described in the exemplary embodiments are essential as means for solving the problems of the invention. Further, the technical elements in the embodiments described above may be applied singly, or may be applied by dividing them into a plurality of portions such as program components and hardware components.

What is claimed is:

1. A composite image creation system comprising:
  a moving object region specifying unit configured to specify a moving object region including a moving object in each of a plurality of images consecutive in times series;
  a luminance correction unit configured to execute luminance correction processing to reduce a difference between a luminance signal in at least a part of one moving object region in one image and a luminance signal in at least a part of another moving object region in another image; and
  an image combining unit configured to combine the one image including the one moving object region subjected to the luminance correction processing with the other image including the other moving object region subjected to the luminance correction processing, and generate a composite image by adding predetermined color information to (i) at least a part of the one moving object region and (ii) at least a part of the other moving object region, the predetermined color information comprising a predetermined order of color information that changes in time series.

2. The composite image creation system according to claim 1, wherein the image combining unit adds the color information to a contour of the one moving object region and a contour of the other moving object region.

3. The composite image creation system according to claim 1, wherein when the color information is added, the image combining unit determines the color information to be added based on a background color of the one moving object region and a background color of the other moving object region.

4. The composite image creation system according to claim 1, wherein when the color information is added, the image combining unit uses a monochrome image as a background color of the one moving object region and as a background color of the other moving object region.

5. The composite image creation system according to claim 1, wherein the image combining unit adds the color information to at least a part of the one moving object region and at least a part of the other moving object region based on a predetermined wavelength order.

6. The composite image creation system according to claim 5, wherein when the image combining unit generates the composite image including a plurality of moving object regions in the time series and adds a number of pieces of the color information corresponding to a predetermined number of colors to the plurality of moving object regions, respectively, the image combining unit uses colors with different brightness or chroma levels for color information to be added to a first moving object region at a start time in the time series and for color information to be added to a second moving object region at an end time in the time series.

7. A composite image creation method comprising:
  a moving object region specifying step of specifying a moving object region including a moving object in each of a plurality of images consecutive in times series;
  a luminance correction step of executing luminance correction processing to reduce a difference between a luminance signal in at least a part of one moving object region in one image and a luminance signal in at least a part of another moving object region in another image; and
  an image combining step of combining the one image including the one moving object region subjected to the luminance correction processing with the other image including the other moving object region subjected to the luminance correction processing, and generating a composite image by adding predetermined color information to (i) at least a part of the one moving object region and (ii) at least a part of the other moving object region, the predetermined color information comprising a predetermined order of color information that changes in time series.

8. A non-transitory computer readable medium storing a composite image creation program for a composite image creation system, the composite image creation program causing a computer to implement:
- a moving object region specifying function for specifying a moving object region including a moving object in each of a plurality of images consecutive in times series;
- a luminance correction function for executing luminance correction processing to reduce a difference between a luminance signal in at least a part of one moving object region in one image and a luminance signal in at least a part of another moving object region in another image; and
- an image combining function for combining the one image including the one moving object subjected to the luminance correction processing with the other image including the other moving object region subjected to the luminance correction processing, and generating a composite image by adding predetermined color information to (i) at least a part of the one moving object region and (ii) at least a part of the other moving object region, the predetermined color information comprising a predetermined order of color information that changes in time series.

* * * * *